United States Patent
Desclos et al.

(10) Patent No.: US 9,872,327 B2
(45) Date of Patent: Jan. 16, 2018

(54) WIRELESS COMMUNICATION SYSTEM AND RELATED METHODS FOR USE IN A SOCIAL NETWORK

(71) Applicant: ETHERTRONICS, INC., San Diego, CA (US)

(72) Inventors: Laurent Desclos, San Diego, CA (US); Barry Matsumori, San Diego, CA (US); Rick Johnson, San Diego, CA (US)

(73) Assignee: ETHERTRONICS, INC., San Diego, CA (US)

( * ) Notice: Subject to any disclaimer, the term of this patent is extended or adjusted under 35 U.S.C. 154(b) by 30 days.

(21) Appl. No.: 15/085,335

(22) Filed: Mar. 30, 2016

(65) Prior Publication Data
US 2016/0212789 A1 Jul. 21, 2016

Related U.S. Application Data

(63) Continuation of application No. 14/031,039, filed on Sep. 18, 2013, now abandoned, and a continuation-in-part of application No. 14/965,881, filed on Dec. 10, 2015, now Pat. No. 9,748,637, which is a continuation-in-part of application No. 14/144,461, filed on Dec. 30, 2013, now Pat. No. 9,240,634, which is a continuation of application No. 13/726,477, filed on Dec. 24, 2012, now Pat. No. 8,648,755, which is a continuation of application No. (Continued)

(51) Int. Cl.
*H01Q 3/26* (2006.01)
*H04W 76/02* (2009.01)
*H04W 52/18* (2009.01)
*H01Q 3/44* (2006.01)
*H04B 7/02* (2017.01)
*H04W 4/20* (2009.01)
*H04W 16/28* (2009.01)
*H04B 7/06* (2006.01)

(52) U.S. Cl.
CPC ........ *H04W 76/025* (2013.01); *H01Q 3/2605* (2013.01); *H01Q 3/2611* (2013.01); *H01Q 3/44* (2013.01); *H04B 7/02* (2013.01); *H04W 4/206* (2013.01); *H04W 52/18* (2013.01); *H04B 7/0617* (2013.01); *H04W 16/28* (2013.01); *H04W 76/023* (2013.01)

(58) Field of Classification Search
CPC ...... H01Q 3/2605; H01Q 3/2611; H01Q 3/44; H01Q 3/00; H01Q 1/24; H01Q 1/44; H04W 76/025; H04W 16/28; H04W 52/18; H04W 76/023
See application file for complete search history.

(56) References Cited

U.S. PATENT DOCUMENTS

2,236,102 A 3/1941 Kolster
2,761,134 A 8/1956 Tewksbury et al.
(Continued)

*Primary Examiner* — Tho G Phan
(74) *Attorney, Agent, or Firm* — Coastal Patent Law Group, P.C.

(57) ABSTRACT

An antenna system and method for managing identification, location, direction and communication with nearby wireless communication devices is provided. Various embodiments can be implemented to enhance the performance of advertising systems, location services, military systems, and social gaming.

13 Claims, 8 Drawing Sheets

Related U.S. Application Data

13/029,564, filed on Feb. 17, 2011, now Pat. No. 8,362,962, which is a continuation of application No. 12/043,090, filed on Mar. 5, 2008, now Pat. No. 7,911,402.

(60) Provisional application No. 61/702,705, filed on Sep. 18, 2012.

(56) References Cited

U.S. PATENT DOCUMENTS

| | | |
|---|---|---|
| 2,938,208 A | 5/1960 | Engel et al. |
| 3,971,031 A | 7/1976 | Burke |
| 4,630,058 A * | 12/1986 | Brown ............... H01Q 1/1257 342/352 |
| 5,235,343 A | 8/1993 | Audren et al. |
| 5,568,155 A | 10/1996 | Tsunekawa |
| 5,598,169 A | 1/1997 | Drabeck |
| 5,777,581 A | 7/1998 | Lilly et al. |
| 5,874,919 A | 2/1999 | Rawnick |
| 5,943,016 A | 8/1999 | Snyder et al. |
| 6,326,921 B1 | 12/2001 | Egorov |
| 6,545,630 B1 * | 4/2003 | Apa ..................... G01S 7/282 342/14 |
| 6,693,594 B2 | 2/2004 | Pankinaho |
| 6,765,536 B2 | 7/2004 | Phillips |
| 6,876,329 B2 | 4/2005 | Milosavljevic |
| 6,903,686 B2 | 6/2005 | Vance et al. |
| 7,068,234 B2 | 6/2006 | Sievenpiper |
| 7,081,854 B2 | 7/2006 | Ying et al. |
| 7,132,989 B1 | 11/2006 | Poilasne |
| 7,180,464 B2 | 2/2007 | Chiang et al. |
| 7,265,720 B1 | 9/2007 | Ponce De Leon |
| 7,324,054 B2 | 1/2008 | Ozkar |
| 7,330,156 B2 | 2/2008 | Arkko et al. |
| 7,830,320 B2 | 11/2010 | Shamblin et al. |
| 7,903,034 B2 | 3/2011 | Anguera et al. |
| 7,911,402 B2 | 3/2011 | Rowson et al. |
| 9,070,969 B2 | 6/2015 | Mow |
| 9,196,955 B2 | 11/2015 | Higaki |
| 9,240,634 B2 | 1/2016 | Rowson |
| 9,515,378 B2 * | 12/2016 | Prasad ................ H04B 7/0617 |
| 2002/0083458 A1 * | 6/2002 | Henderson ............ H01Q 1/007 725/72 |
| 2004/0227667 A1 | 11/2004 | Sievenpiper |
| 2013/0257668 A1 * | 10/2013 | Rao ..................... H01Q 1/40 343/767 |
| 2015/0070229 A1 * | 3/2015 | Alexopoulos ........... H01Q 1/36 343/745 |
| 2015/0194736 A1 * | 7/2015 | Diukman .............. H01Q 1/48 343/818 |
| 2016/0111772 A1 * | 4/2016 | Lilja ..................... H01Q 1/243 343/702 |

* cited by examiner

M Element Array Configuration

WIRELESS COMMUNICATION SYSTEM AND RELATED METHODS FOR USE IN A SOCIAL NETWORK

CROSS-REFERENCE TO RELATED APPLICATIONS

This application is a continuation (CON) of U.S. Ser. No. 14/031,039, filed Sep. 18, 2013, which claims benefit of priority with U.S. Provisional Ser. No. 61/702,705, filed Sep. 18, 2012; and this application is a continuation in part (CIP) of U.S. Ser. No. 14/965,881, filed Dec. 10, 2015; which is a CIP of U.S. Ser. No. 14/144,461, filed Dec. 30, 2013, now U.S. Pat. No. 9,240,634, issued Jan. 19, 2016; which is a continuation of U.S. Ser. No. 13/726,477, filed Dec. 24, 2012, now U.S. Pat. No. 8,648,755, issued Feb. 11, 2014; which is a continuation of U.S. Ser. No. 13/029,564, filed Feb. 17, 2011, now U.S. Pat. No. 8,362,962, issued Jan. 29, 2013; which is a continuation of U.S. Ser. No. 12/043,090, filed Mar. 5, 2008, now U.S. Pat. No. 7,911,402, issued Mar. 22, 2011.

FIELD OF INVENTION

This invention relates to social gaming and location services in the mobile wireless domain, and more specifically to an antenna system and methods for managing communications with one or more users among a wireless communication network.

SUMMARY

In a wireless network configured to provide communications between a designated wireless device and one or more linkable devices, each of the designated and linkable devices individually comprising an antenna system for maintaining a communication link with the wireless network, an antenna system and related methods are configured to manage connectivity between the designated device and the linkable devices for enabling one or more social networking capabilities, including but not limited to: identifying one or more linkable devices located within proximity to a designated wireless device; optimizing a communication link between the designated device and one or more of the linkable devices in the network; terminating communication between the designated device and one or more of the linkable devices; adjusting transmit power of one or more of the designated device and linkable devices for improving communication therebetween; categorizing one or more of the linkable devices into one or more user-defined groups; transmitting a data file to one or more of the linkable devices based on group assignment or proximity within the network; or providing communication with one or more linkable devices determined to be present within a pre-determined proximity with the designated device.

DETAILED DESCRIPTION

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions.

An antenna system is provided for use with a designated device configured to communicate with one or more linkable devices within a wireless network.

It should be noted that "designated device" as used herein refers to a single wireless device within the network that is being configured to manage connectivity between it and other devices on the network; the other devices are herein referred to as "linkable devices" since the designated device may select whether or not to link with each of the other devices.

Upon communicating with one of the linkable devices, generally by producing an antenna beam pattern capable of establishing a link connection between the designated device and the selected linkable device, the designated device is said to be linked, or connected with a "linked" device.

Moreover, upon generating an antenna beam pattern having a null steered or directed toward another of the linkable devices, thereby eliminating potential for connectivity therewith, the designated device is said to be blocking or terminating communication with the selected device, or "blocked" device.

Each of the linkable devices may individually comprise a mobile wireless device, or a static (fixed position) device connected to the wireless network.

The antenna system and related methods are configured to manage connectivity between the designated device and the linkable devices for enabling one or more social networking capabilities, including at least one of:

identifying one or more linkable devices located within proximity to a designated wireless device; optimizing a communication link between the designated device and one or more of the linkable devices in the network;

terminating communication between the designated device and one or more of the linkable devices; adjusting transmit power of one or more of the designated device and linkable devices for improving communication therebetween;

categorizing one or more of the linkable devices into one or more user-defined groups; transmitting a data file to one or more of the linkable devices based on group assignment or proximity within the network; or providing communication with one or more linkable devices determined to be present within a pre-determined proximity with the designated device.

When taken alone, each of the devices within the network may or may not comprise an antenna system capable of configuring an antenna beam pattern for managing connectivity between the designated device and the linkable devices for enabling one or more social networking capabilities. In other words, not all devices must be configured with the antenna system or methods described herein, and a single enabled device can be configured to manage connectivity between the designated device and the linkable devices for enabling one or more social networking capabilities without a requirement that all devices within the network be similarly configured.

Preferably, the antenna system comprises one or more multi-mode antennas capable of beam steering and band switching to form a plurality of radiation modes as described in commonly owned U.S. Ser. No. 13/726,477, filed Dec. 24, 2012, and titled "ANTENNA AND METHOD FOR STEERING ANTENNA BEAM DIRECTION"; the contents of which are hereby incorporated by reference. The antenna system further comprises an adaptive processor and an antenna tuning module, wherein the antenna is configured to generate a radiation pattern which maximizes antenna gain in the direction of one or more intended linked devices and minimizes gain (or null steers) in the direction of one or more unintended blocked devices.

Figure 8:
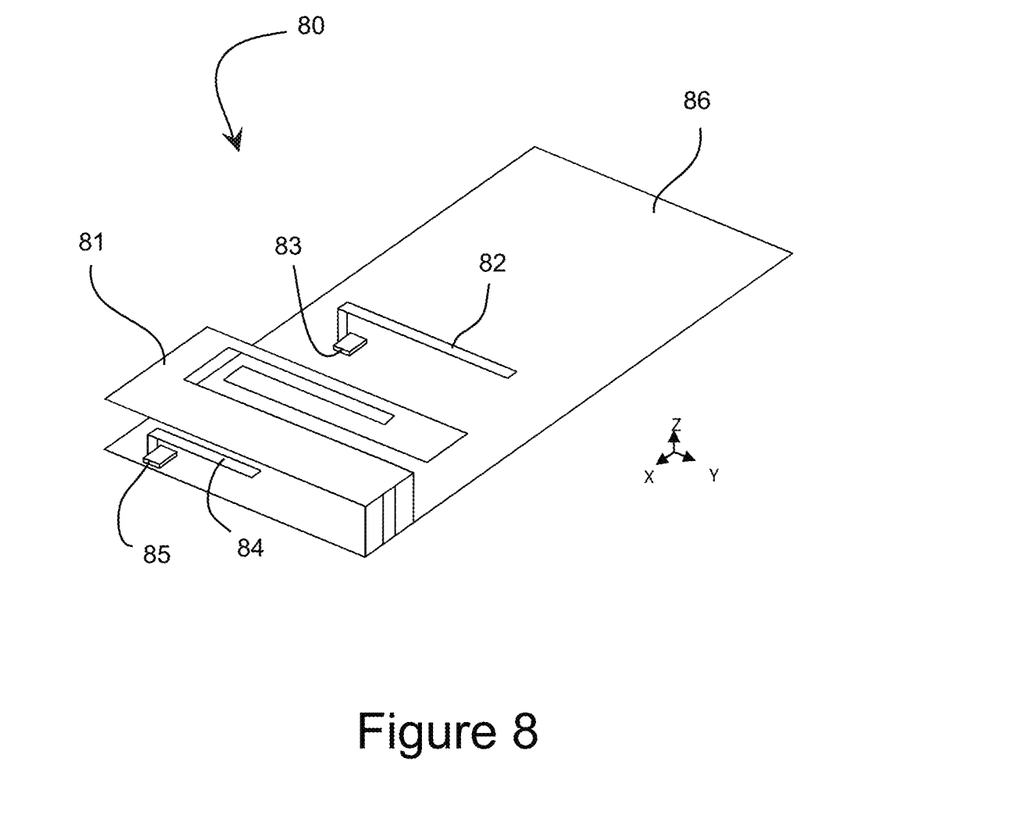
FIG. 8 shows a modal antenna having an isolated magnetic dipole (IMD) antenna element positioned above a ground plane forming an antenna volume therebetween, a first parasitic element and first active element coupled therewith, and a second parasitic element and second active element coupled therewith; the first parasitic element is positioned outside of the antenna volume and the second parasitic element is positioned within the antenna volume.

FIG. 8 illustrates a modal antenna for use with the present invention, where the modal antenna 80 comprises a main IMD antenna element 81, which is situated on a ground plane 86 forming an antenna volume therebetween. The modal antenna further comprises a first parasitic element 82 that is coupled with a first active element 83, and a second parasitic tuning element 84 that is coupled with a second active element 85. The first parasitic element 82 is positioned outside of the antenna volume. The second parasitic element 84 is positioned within the antenna volume. In this exemplary embodiment, the active elements 83 and 85 may comprise two state switches that either electrically connect (short) or disconnect (open) the parasitic elements to the ground. The antenna 80 can advantageously provide frequency splitting and beam steering capabilities with an additional frequency shifting capability.

The antenna system is configured to scan for connectivity with one or more devices in all directions, identifying one or more linkable devices within a pre-determined proximity with the designated device. The predetermined proximity may be up to one mile, or greater, depending on user defined specifications. Once all nearby linkable devices are identified, the antenna system is configured to communicate with each device to obtain a device identification tag. The device identification tag is processed within the antenna system to determine for each device whether to link or to block. To do this, a lookup table may be stored in memory, the lookup table comprising data relating one or more devices with one or more instructions, such as "connect" or "block". Based on the instruction, the antenna system is configured to adjust the antenna radiation pattern by generating either a gain maxima or a null in the direction of the respective device. Thus, with communication enabled, the respective device is capable of recognizing and linking with the designated device and the devices are said to be linked. Alternatively, with communication disabled, the respective device is not capable of recognizing or linking with the designated device and the devices are said to be blocked.

Thus, the antenna system comprises: a multi-mode antenna coupled to an antenna tuning module for providing multiple distinct antenna modes, wherein the antenna is configured to produce a distinct radiation pattern at each of the multiple modes; an adaptive processor capable of selecting an operation mode and communicating said mode to the antenna tuning module, and memory comprising one or more lookup tables for storing data associated with one or more device identification tags, antenna modes, or other related data.

The antenna system is configured with at least one algorithm for scanning the network to identify proximally located linkable devices by identification tag; comparing the identification tag for each device with a lookup table to identify a user-specified instruction for each device, such as "connect" or "block"; and generating one or more modes of the one or more multi-mode antennas of the device to implement the instruction for each respective linkable device identified.

Transmit power can be modulated to enhance or reduce communication link performance between the designated device and select linkable devices in the network. This can be accomplished using the multimode antenna as described above.

Other metrics for link quality may be considered for enhancing or reducing communications link performance between respective linkable devices within the network.

User-specified groups, such as a "connect" group or a "block" group may be created by a user of the designated device by associating known device identification tags with respective instructions. Additionally, the user may elect to connect with a geographically based group (nearby devices), for example to find friends within an area and meet up for a social activity. These and other groups may be configured and stored in memory within the antenna system.

Figure 1:
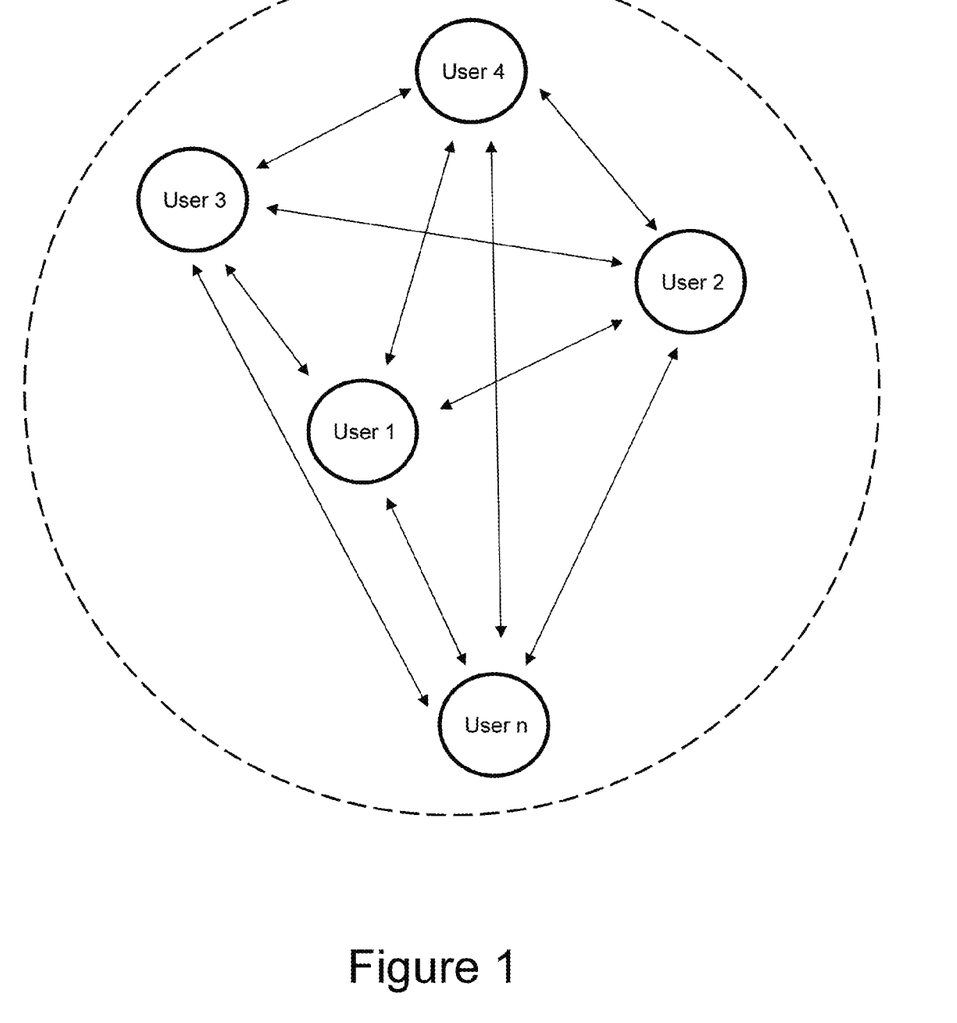
FIG. 1 shows a wireless network containing a designated wireless device and one or more linkable devices in proximity to each other, each of the devices is communicating with at least one other device within the network.

Turning now to the drawings, FIG. 1 a wireless network containing a designated wireless device (User 1) and one or more linkable devices (Users 2, 3, 4, and n) in proximity to each other, each of the devices is communicating with at least one other device within the network. A communication region defined by the antenna radiation pattern and range of the designated device is identified using dashed lines.

Figure 2:
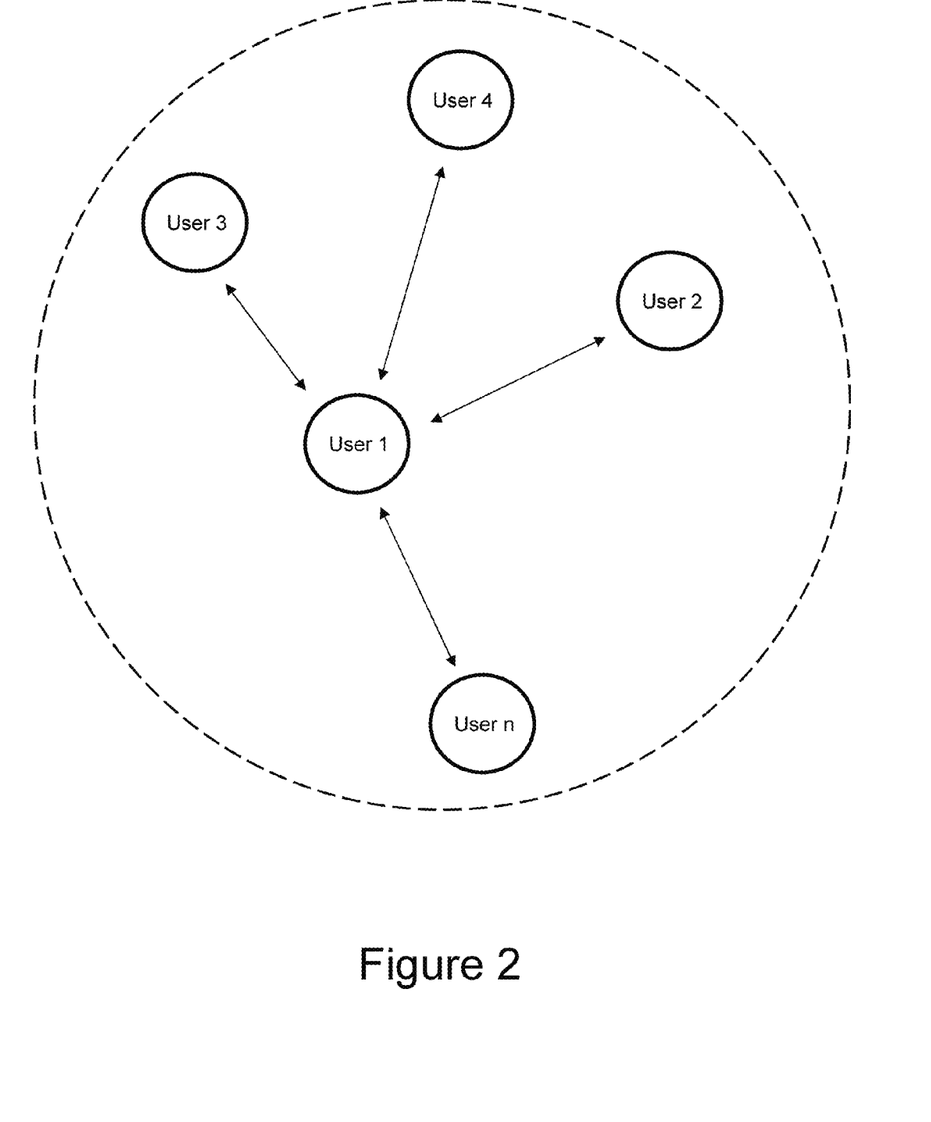
FIG. 2 shows a designated device identifying other linkable devices within detection and/or communication range.

FIG. 2 shows a designated device identifying other linkable devices within detection and/or communication range. This initial function of identifying linkable devices is performed prior to communicating with other users on the network.

Figure 3:
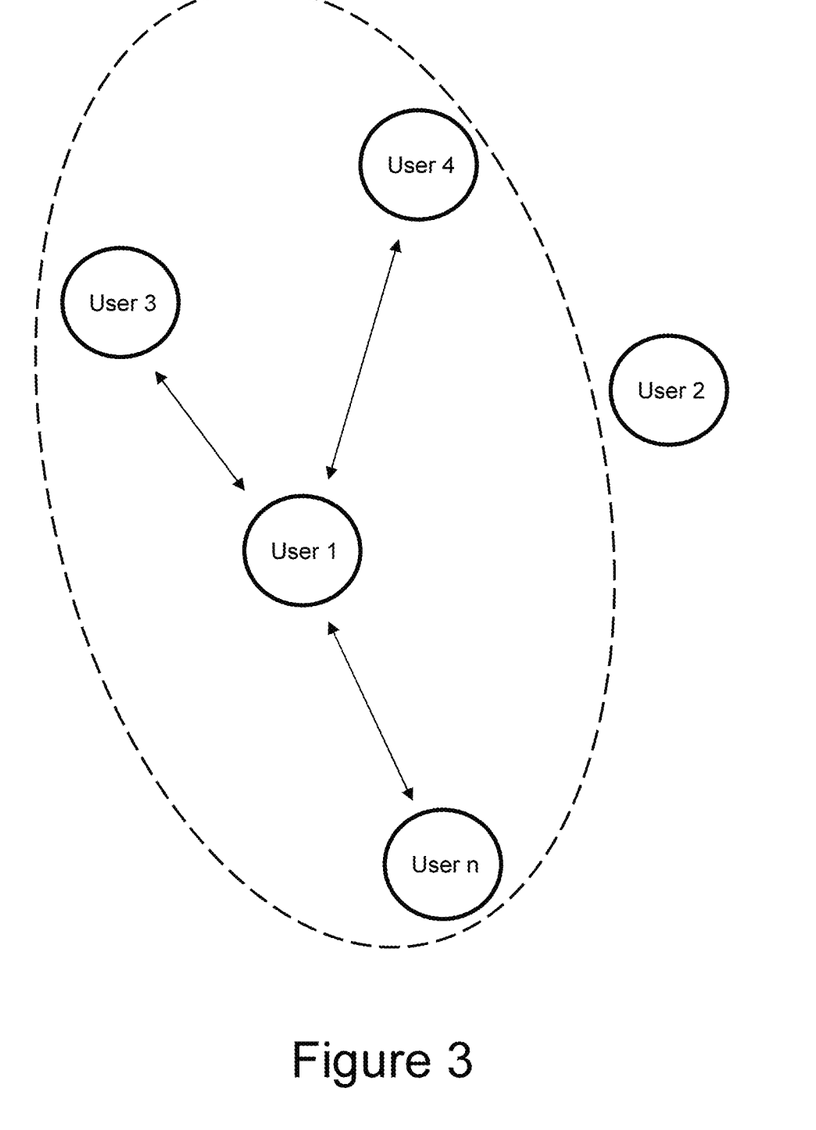
FIG. 3 shows a designated device configured to communicate with a plurality of linked devices within the network, and further configured to terminate (block) communication with a non-selected device.

FIG. 3 shows a designated device (User 1) configured to communicate with a plurality of linked devices (Users 3, 4, and n) within the network, and further configured to terminate (block) communication with a non-selected device (User 2). The radiation pattern or mode generated by the antenna system of the designated device is configured to span a region containing linked devices (Users 3, 4, and n) while excluding the blocked device (User 2).

Figure 4:
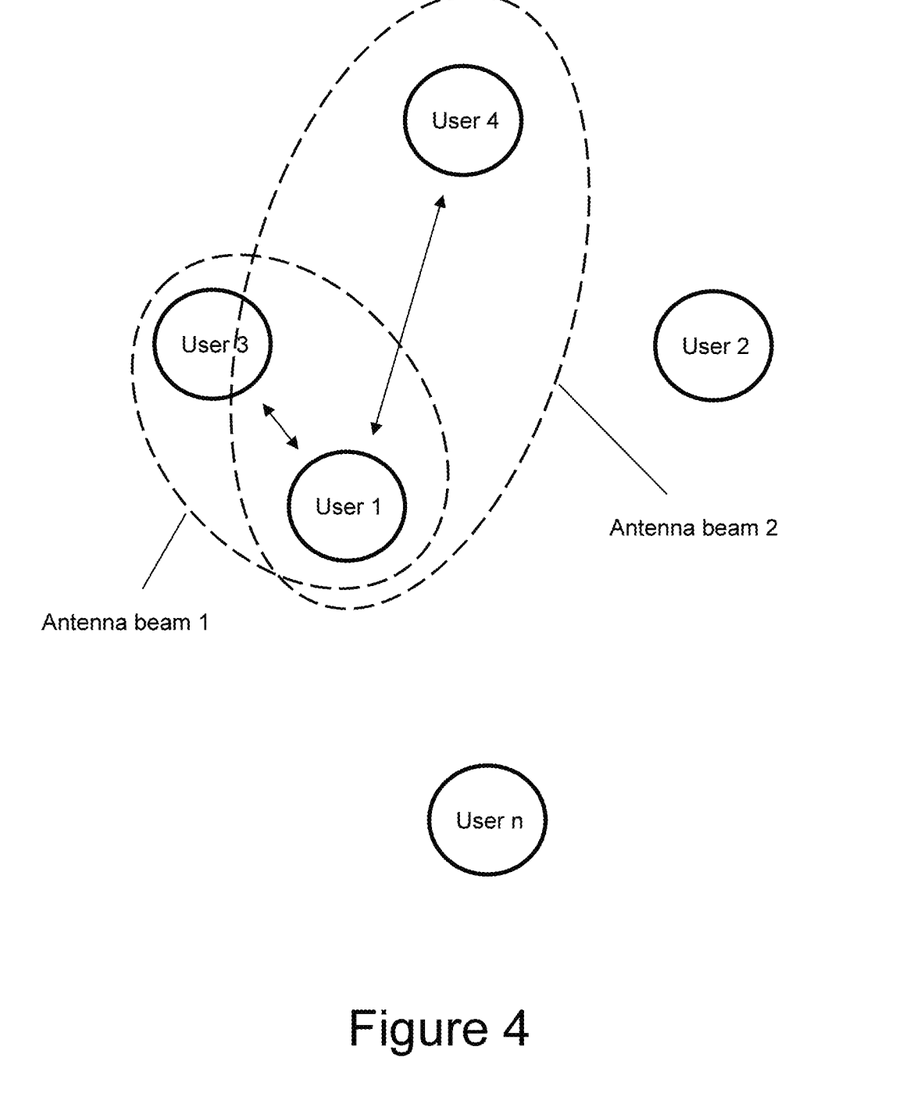
FIG. 4 shows a designated device utilizing two antenna beams to communicate with each of two linked devices within the network, and block at least one device from communication. During communication, transmit power is adjusted to improve communication with the linked devices, reduce communication with other users, or both.

FIG. 4 shows a designated device utilizing two antenna beams to communicate with each of two linked devices within the network, and block at least one device from communication. During communication, transmit power is adjusted for at least one of: improving communication link quality with the linked devices, or reducing communication link quality with other users. A first antenna beam of the two antenna beams is optimized for communication between the designated device (User 1) and linked device (User 3). A second antenna beam of the two antenna beams is optimized for communication between the designated device (User 1) and linked device (User 4). Each of the first and second antenna beams is steered away from blocked devices (User 2 and n). Alternatively, power may be reduced to exclude a distant device.

Figure 5:
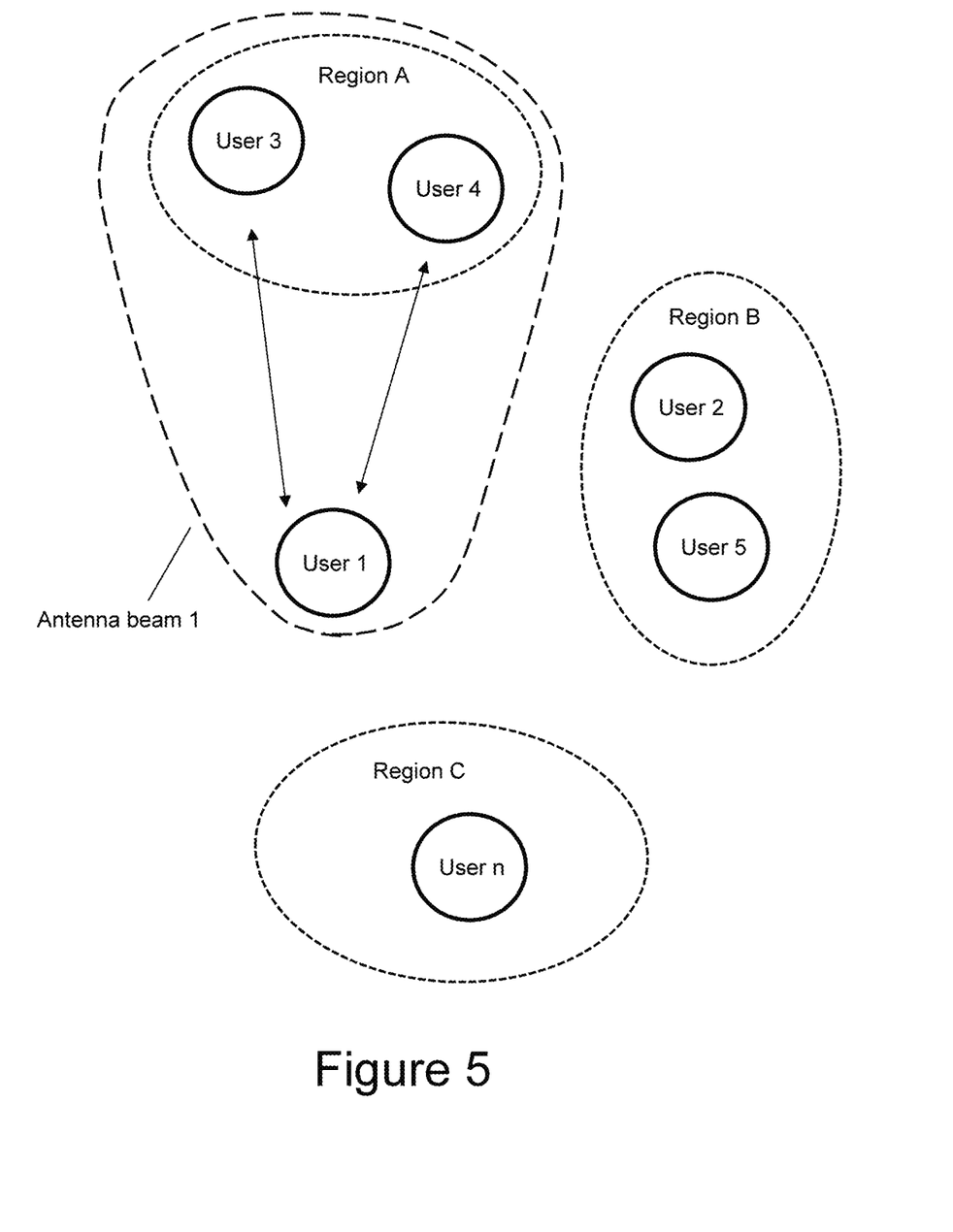
FIG. 5 shows three geographical regions within a network environment, a designated device is communicating with linked devices in Region A, wherein antenna beam 1 is synthesized to shape a radiation pattern to optimize for communication with devices in region A while excluding communication with devices in Regions B and C.

FIG. 5 shows three geographical regions within a network environment, a designated device is communicating with linked devices in a first region (Region A), wherein antenna beam 1 is synthesized to shape a radiation pattern to optimize for communication with linked devices (Users 3 and 4) within Region A while excluding communication with blocked devices (Users 2, 5 and n) in Regions B and C. Thus, the designated device is configured to communicate with linked devices in a specific geographic location.

Figure 6A:
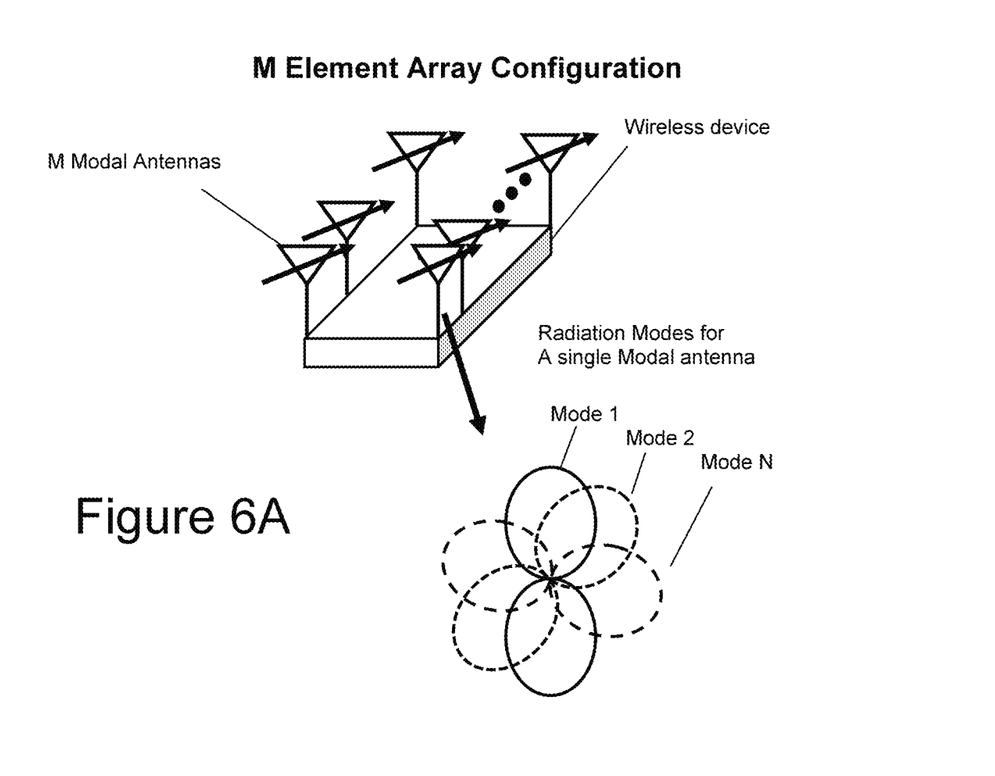
FIG. 6A shows an antenna system having an "M" element array of modal antennas; each modal antenna has "N" unique radiation patterns or "modes", wherein a combination of the M modal antennas in the array will generate $M^N$ unique radiation patterns or modes.
Figure 6B:
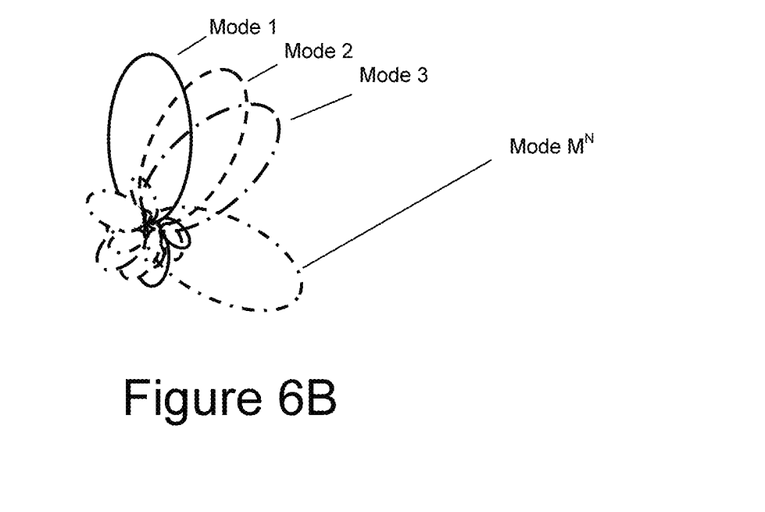
FIG. 6B shows respective antenna radiation patterns associated with the antenna system of FIG. 6A and multiple modes thereof.

FIG. 6A shows an antenna system having an "M" element array of modal antennas; each modal antenna has "N" unique radiation patterns or "modes" associated therewith, wherein a combination of the M modal antennas in the array will generate $M^N$ unique radiation patterns or modes. FIG. 6B shows respective antenna radiation patterns associated with the antenna system of FIG. 6A and multiple modes thereof. Additional radiation patterns can be generated using the array by applying phase shifts to the various antenna elements to steer the array radiation pattern. The multiple beams that can be generated can be used to communicate with selected users.

Figure 7:
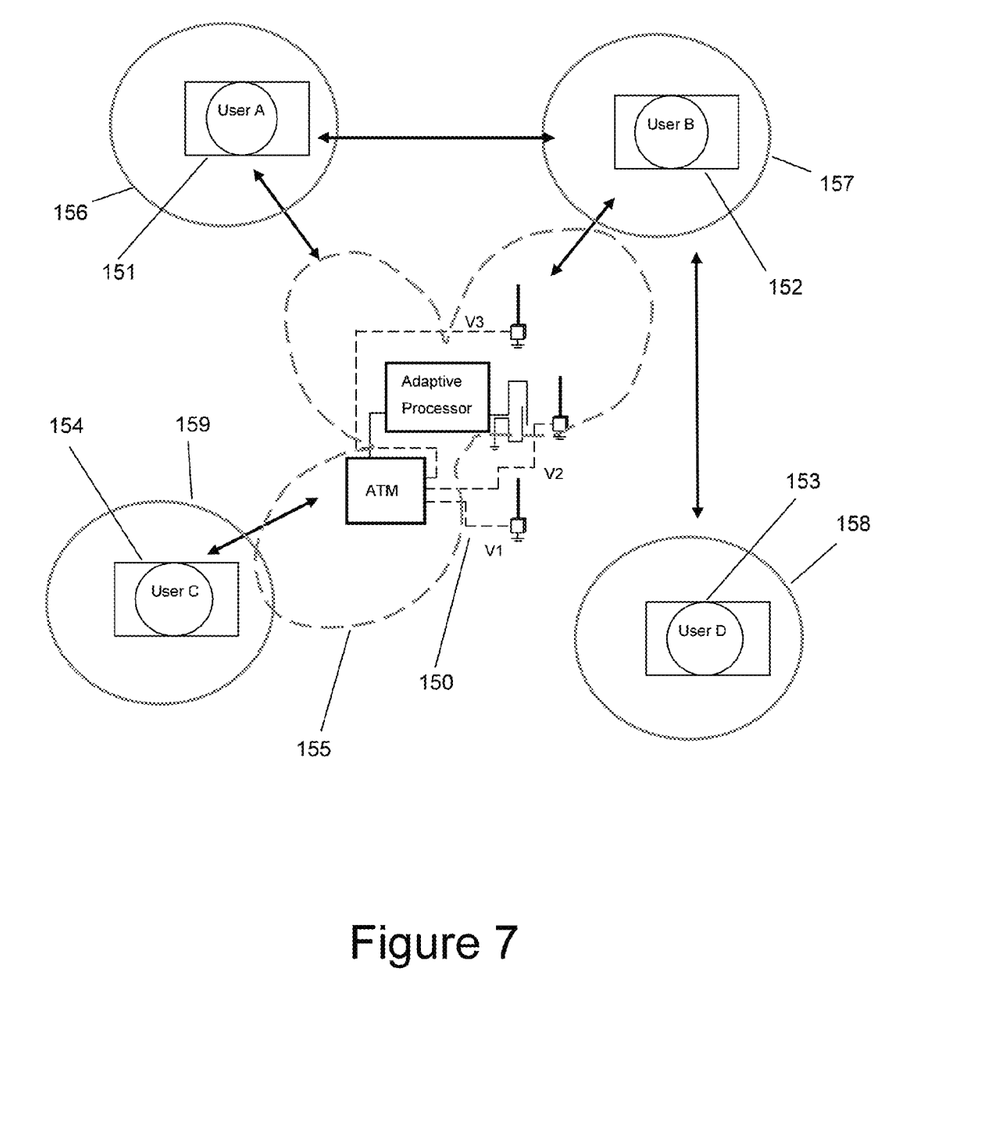
FIG. 7 shows an adaptive antenna system used in a multi-user environment, the adaptive antenna system is capable of shaping a radiation pattern of the antenna system to maximize link quality for intended devices (User A; User B; and User C), while minimizing interference from an undesired device (User D).

FIG. 7 shows an adaptive antenna system used in a multi-user environment, the adaptive antenna system is capable of shaping a radiation pattern of the antenna system to maximize link quality for intended devices (User A; User B; and User C), while minimizing interference from an undesired device (User D). The antenna tuning module (ATM) contains circuitry configured to send control signals to active components that are coupled to parasitic elements positioned adjacent to the antenna. The reactive loading of one or multiple parasitic elements in proximity to the antenna element connected to the adaptive processor is altered to shape the antenna radiation pattern. In this embodiment, the antenna pattern (155) is optimized to couple the designated device with three linked devices (151, 152, and 154) each having respective antenna patterns (156, 157, and 159). The antenna system (150) of the designated device forms a null in the direction of blocked device 153 having associated antenna pattern 158.

In one aspect, the antenna system of a designated device is configured to manage connectivity between the designated device and one or more linkable devices for enabling one or more social networking capabilities as described above.

In another aspect, a wireless communication method for enabling one or more social networking capabilities using the antenna system is provided. The method comprises identifying one or more linkable devices located within proximity to a designated wireless device; and at least one of:

optimizing a communication link between the designated device and one or more of the linkable devices in the network;

terminating communication between the designated device and one or more of the linkable devices;

adjusting transmit power of one or more of the designated device and linkable devices for improving communication therebetween;

categorizing one or more of the linkable devices into one or more user-defined groups; transmitting a data file to one or more of the linkable devices based on group assignment or proximity within the network; or providing communication with one or more linkable devices determined to be present within a pre-determined proximity with the designated device.

In yet another aspect, an algorithm is configured to implement the above wireless communication method within an antenna system of a designated device.

In yet another aspect, a software application comprises a user interface for managing identified devices, instructions, settings, and storage of related data for use with the antenna system and in accordance with the methods herein.

Other features and advantages will be understood by those having skill in the art upon a thorough review of the embodiments of the above description and the appended drawings. Although several illustrative features and embodiments are described herein, it should be understood that these details and descriptions are not intended to limit the spirit and scope of the invention as set forth in the claims.

What is claimed is:

1. A multi-mode antenna system configured to enable one or more social networking capabilities between a designated device and one or more linkable devices each connected within a wireless network, the antenna system comprising:
    a modal antenna coupled to an antenna tuning module for configuring the modal antenna in one of a plurality of possible antenna modes, wherein the modal antenna is configured to produce a distinct radiation pattern when configured in each of the plurality of possible antenna modes; and
    an adaptive processor coupled to each of the modal antenna and the antenna tuning module, the adaptive processor being configured with an algorithm for adjusting a radiation pattern associated with the modal antenna, the algorithm configured to:
    identify the one or more linkable devices within the wireless network, said linkable devices being within a user-defined proximity with the designated device containing the multi-mode antenna system; and
    send control signals to the antenna tuning module for adjusting the radiation pattern of the modal antenna;
    wherein the multi-mode antenna system is configured to: selectively produce one of: a gain maxima or a null in a direction associated with each of the identified linkable devices.

2. The antenna system of claim 1, wherein the modal antenna comprises: an antenna radiator disposed above a ground plane forming an antenna volume therebetween, a first parasitic element at least partially disposed within said antenna volume, said first parasitic element being coupled with a first active tuning element for varying a reactance of the antenna; and a second parasitic element positioned outside of the antenna volume and adjacent to the antenna radiator, said second parasitic element being coupled with a second active tuning element for varying a current mode thereon.

3. The antenna system of claim 1, wherein the antenna system is configured to:
  communicate with each of the linkable devices;
  obtain a device identification tag from each of the linkable devices; and
  process each of the identification tags to determine for each linkable device whether to link or to block communications therewith.

4. The antenna system of claim 3, wherein the antenna system is further configured to:
  compare each of the identification tags with a lookup table to identify a user-specified instruction for each device, wherein the instruction comprises one of: connect or block; and
  implement the user specified instruction by adjusting the radiation pattern of the modal antenna.

5. The antenna system of claim 1, comprising: two or more modal antennas configured in an array.

6. The antenna system of claim 5, wherein the antenna system is configured to adjust the radiation pattern of each of the modal antennas to adjust the overall radiation pattern of the array.

7. In a designated device comprising a multi-mode antenna system as described in claim 1, a method for enabling one or more social networking capabilities between the designated device and another device within a wireless network, the method comprising:
  identifying one or more linkable devices located within proximity to the designated wireless device; and
  at least one of:
    optimizing a communication link between the designated device and one or more of the linkable devices in the network;
    terminating communication between the designated device and one or more of the linkable devices;
    adjusting transmit power of one or more of the designated device and linkable devices for improving communication therebetween;
    categorizing one or more of the linkable devices into one or more user-defined groups;
      transmitting a data file to one or more of the linkable devices based on group assignment or proximity within the network; or
    providing communication with one or more linkable devices determined to be present within a pre-determined proximity with the designated device.

8. The method of claim 7, wherein said optimizing comprises forming gain maxima in the radiation pattern by selecting an optimum antenna mode of the modal antenna.

9. The method of claim 7, wherein said optimizing comprises steering the antenna radiation pattern of the designated device to maximize link quality in a direction of one or more of the linkable devices.

10. The method of claim 7, wherein said terminating comprises creating a null in the antenna radiation pattern and orienting said null in a direction of one or more of the linkable devices.

11. The method of claim 7, wherein said terminating comprises reducing antenna transmit power in a direction of one or more of the linkable devices.

12. The method of claim 7, wherein said terminating comprises steering the null in a direction of one or more of the linkable devices.

13. The method of claim 7, further comprising:
  communicating data to one or more of the linkable devices, wherein said data comprises instructions for configuring a mode of a modal antenna associated with the linkable device.

* * * * *